(12) United States Patent
Chatterton

(10) Patent No.: US 9,037,082 B2
(45) Date of Patent: May 19, 2015

(54) WIRELESS TECHNOLOGY BRIDGING SYSTEM

(71) Applicant: EBAY INC., San Jose, CA (US)

(72) Inventor: Geoffrey W. Chatterton, Santa Clara, CA (US)

(73) Assignee: EBAY INC., San Jose, CA (US)

( * ) Notice: Subject to any disclaimer, the term of this patent is extended or adjusted under 35 U.S.C. 154(b) by 3 days.

(21) Appl. No.: 14/012,722

(22) Filed: Aug. 28, 2013

(65) Prior Publication Data

US 2015/0063472 A1    Mar. 5, 2015

(51) Int. Cl.
   *H04B 5/00* (2006.01)
   *H04B 7/26* (2006.01)
   *H04L 29/06* (2006.01)

(52) U.S. Cl.
   CPC .............. *H04B 7/26* (2013.01); *H04L 63/0492* (2013.01)

(58) Field of Classification Search
   CPC ........................................................ H04B 5/02
   USPC ...................................... 455/41.1, 90.3, 41.2
   See application file for complete search history.

(56) References Cited

U.S. PATENT DOCUMENTS

| | | | |
|---|---|---|---|
| 8,112,066 B2 | 2/2012 | Ayed | |
| 2008/0225853 A1* | 9/2008 | Melman et al. | 370/392 |
| 2009/0180421 A1* | 7/2009 | Hall et al. | 370/316 |
| 2009/0193500 A1 | 7/2009 | Griffin et al. | |
| 2011/0007744 A1* | 1/2011 | Melman et al. | 370/392 |
| 2011/0068892 A1 | 3/2011 | Perkins et al. | |
| 2012/0094598 A1 | 4/2012 | Tysowski | |
| 2012/0106553 A1* | 5/2012 | Melman et al. | 370/392 |
| 2012/0166338 A1 | 6/2012 | Agnelli et al. | |

* cited by examiner

*Primary Examiner* — April G Gonzales
(74) *Attorney, Agent, or Firm* — Haynes and Boone, LLP

(57) ABSTRACT

A bridged wireless communication system includes a user device that is configured to perform wireless communications natively using a second wireless technology, and a wireless technology bridging system chassis such as, for example, a user device case, coupled to the user device. The wireless technology bridging system chassis houses a first technology wireless controller that is configured to perform wireless communications using a first wireless technology that is different from the second wireless technology, and a second technology wireless controller that is configured to perform wireless communications using the second wireless technology. A bridging engine receives first wireless communications of the first wireless technology through the first technology wireless controller, converts the first wireless communications from the first wireless technology to the second wireless technology, and sends the first wireless communications of the second wireless technology through the second wireless technology controller and to the user device.

20 Claims, 13 Drawing Sheets

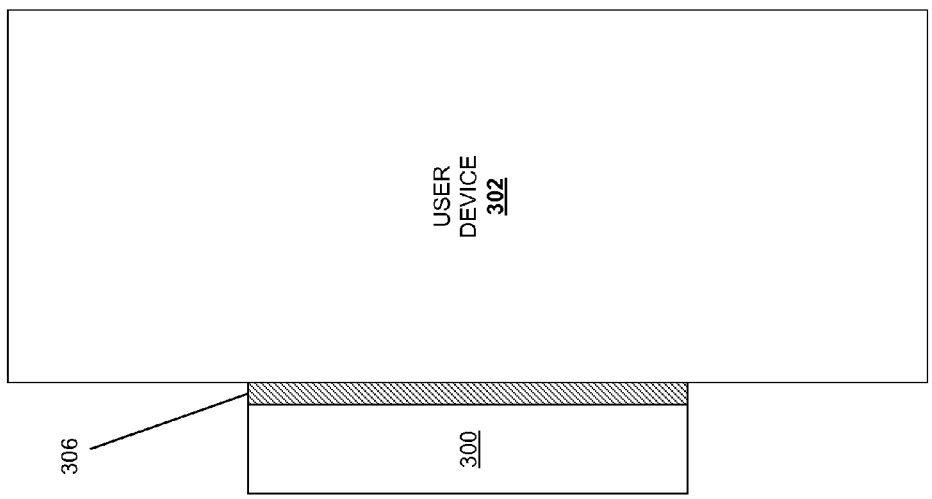

US 9,037,082 B2

WIRELESS TECHNOLOGY BRIDGING SYSTEM

BACKGROUND

1. Field of the Invention

The present disclosure generally relates to mobile payments and other mobile functionality, and more particularly to wireless technology bridging system that allows a user device to make mobile payment and/or use other mobile functionality that requires a wireless technology that is not natively supported by the user device.

2. Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

However, some user devices such as, for example, mobile phones, may be limited by the wireless technology provided natively in those user device, and those limitations may result in the inability to make a mobile payment using a mobile payment system or utilize other mobile system functionality known in the art. For example, some mobile user devices such as, for example, Android® mobile user devices available from a variety of different manufacturers including Samsung Electronics Co. Ltd, of Suwon, South Korea, include Near Field Communication (NFC) wireless controllers in the mobile user device that allow for native NFC communications with other NFC devices such as, for example, Point-Of-Sale devices used in mobile payment systems to conduct payment transactions with a merchant. Other mobile user devices such as, for example, iPhone® mobile user devices available from Apple Inc., of Cupertino, Calif., include Bluetooth® wireless controllers in the mobile user device to allow for native Bluetooth® or Bluetooth® low energy (BLE) communications with other Bluetooth devices such as, for example, merchant location check-in devices used in mobile check-in systems that allow a user to connect their mobile user device to a merchant device or other check-in system provider device.

However, because many mobile user devices only natively support one type of wireless technology, those mobile user devices cannot function with systems that use another type of wireless technology. Using the examples provided above, many iPhone® mobile user devices cannot use mobile payment systems incorporating NFC wireless controllers, while many Android® devices cannot use check-in systems incorporating Bluetooth® wireless controllers.

Thus, there is a need for an improved wireless communications system

BRIEF DESCRIPTION OF THE FIGURES

FIG. 3 is a schematic view illustrating an embodiment of the wireless technology bridging system of FIG. 2a or 2b coupled to a user device;

Figure 1:
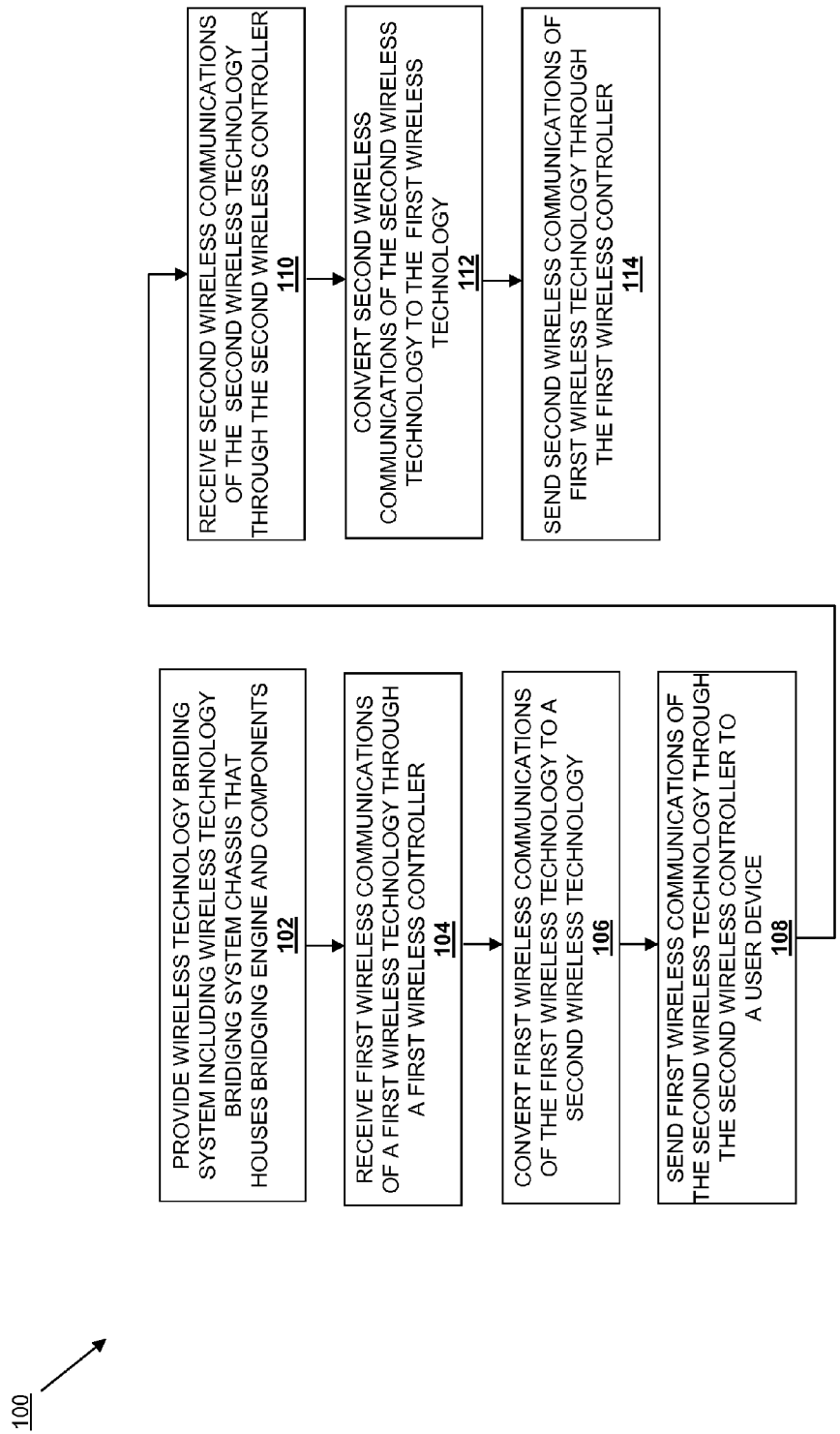
FIG. 1 is a flow chart illustrating an embodiment of a method for bridging wireless technologies.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for bridging wireless technologies such that a user device may communicate using a wireless technology that is not native to that user device. In some embodiments, the user device includes a second technology wireless controller (e.g., a Bluetooth® wireless controller) that is configured to perform wireless communications using a second wireless technology (e.g., Bluetooth® wireless technology, a Bluetooth® Low Energy (BLE) wireless technology, etc.), and thus the second wireless technology is native to the user device. However, a wireless communication system provided by, for example, a merchant device in a merchant physical location, may be configured to perform wireless communications using a first wireless technology (e.g., a Near Field Communications (NFC) wireless technology) for which a first wireless controller (e.g., an NFC wireless controller) is not included in the user device, and as such, the first wireless technology is not native to the user device. The wireless technology bridging systems and methods described herein provide for wireless communication between the user device and the wireless communication system of the merchant device by including each of a first technology wireless controller and a second technology wireless controller on a circuit board that is housed in a wireless technology bridging system chassis (e.g., a user device case, an adhesive chassis, etc.) that is configured to be coupled to the user device.

In operation, the first technology wireless controller in the wireless technology bridging system is used to receive first wireless communications of the first wireless technology from the first technology wireless controller in the wireless communication system of the merchant device, and a bridging engine in the wireless technology bridging system converts those first wireless communications from the first wireless technology to the second wireless technology. The second technology wireless controller in the wireless technology bridging system is then used to send the first wireless communications of the second wireless technology to the second technology wireless controller in the user device. The user device then responds with second wireless communications of the second wireless technology using the second technology wireless controller in the user device, and the second technology wireless controller in the wireless technology bridging system is used to receive those second wireless communications. The bridging engine in the wireless technology bridging system converts those second wireless communications from the second wireless technology to the first wireless technology, and the first technology wireless controller in the wireless technology bridging system is then used to send the second wireless communications of the first wireless technology to the first technology wireless controller in the wireless communication system of the merchant device. As such, the user device is enabled to communicate with the wireless communication system of the merchant device despite the fact that each utilize a different wireless technology.

Referring now to FIG. 1, an embodiment of a method 100 for bridging wireless technologies is illustrated. In the embodiments discussed below, one or more merchant devices at a merchant physical location operate to provide a wireless communication system that utilizes a first wireless technology, and the wireless technology bridging system of the present disclosure is used to enable communications between the wireless communication system and a user device by bridging that first wireless technology and a different, second wireless technology that is native to the user device. However, the wireless communication system that utilizes the first wireless technology may be operated by any wireless system provider, and thus should not be limited to those operated by merchants.

Furthermore, in some of the embodiments discussed below, the wireless communication system that utilizes the first wireless technology is provided, at least in part, to enable communication with a payment service provider such as, for example, PayPal, Inc. of San Jose, Calif. that provides various payment services that allow users to interact with merchants using user devices and merchant devices, respectively. For example, the payment service provider may enable the user to "check-in" or otherwise indicate their presence at the merchant physical location to, for example, access payment services, merchant information, and/or other check-in functionality known in the art. Furthermore, the payment service provider may enable payment transactions between the user device and the merchant device by receiving instructions from the user device to transfer funds from a user account of the user (e.g., provided by an account provider, the payment service provider, etc.) to a merchant account of the merchant (e.g., provided by an account provider, the payment service provider, etc.) in order to make a purchase. However, these users of the wireless communication system are meant to be merely exemplary, and one of skill in the art in possession of the present disclosure will recognize that the wireless technology bridging system may be used for a wide variety of wireless communications scenarios while remaining within the scope of the present disclosure.

Figure 2A:
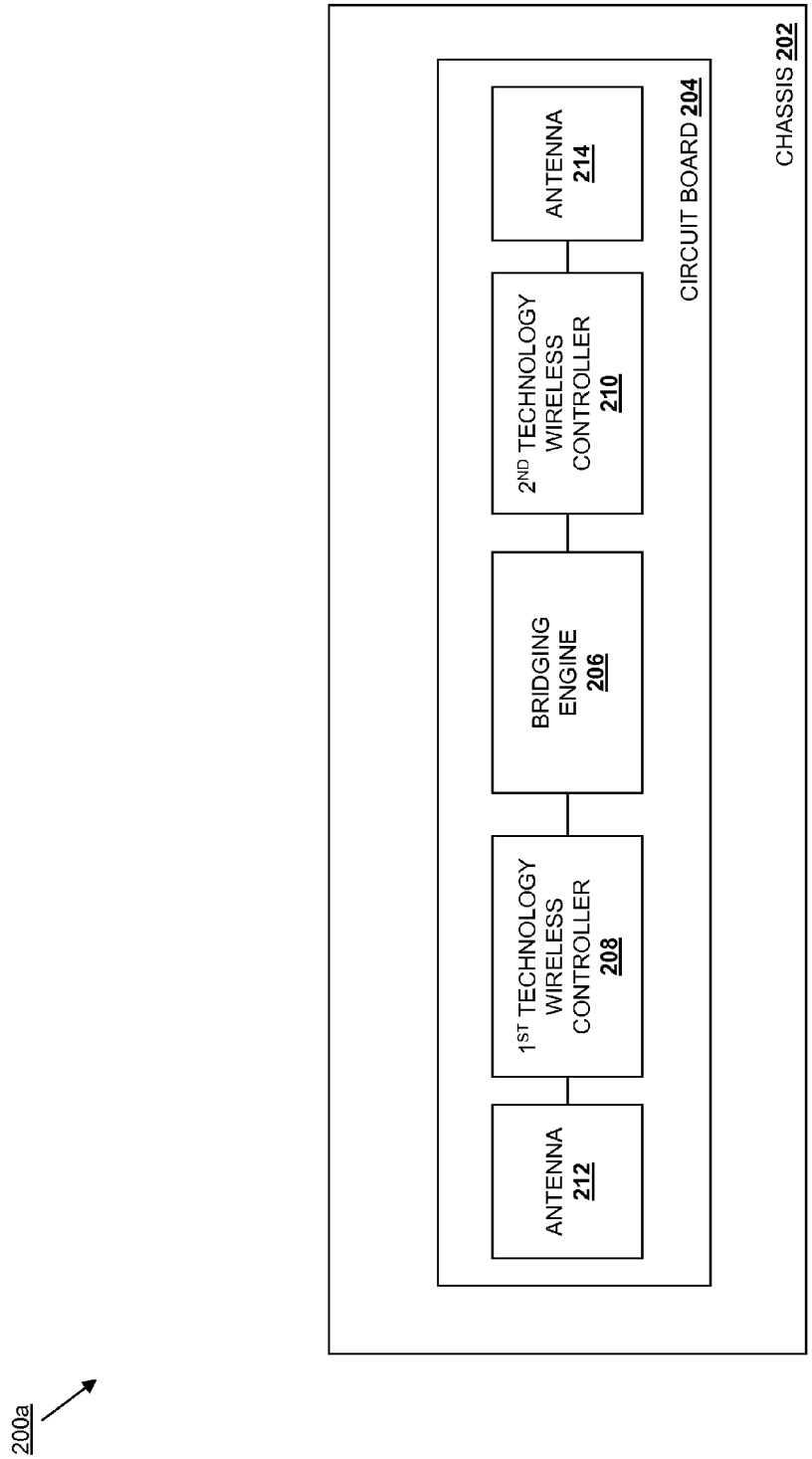
FIG. 2a is a schematic view illustrating an embodiment of a wireless technology bridging system.

The method 100 begins at block 100 where a wireless technology bridging system is provided that includes a wireless technology bridging system chassis that houses a bridging engine and bridging components. Referring first to FIG. 2a, an embodiment of a wireless technology bridging system 200a is illustrated. In the illustrated embodiment, the wireless technology bridging system 200a includes a wireless technology bridging system chassis 202 that houses a circuit board 204. As discussed in further detail below, each of a non-transitory memory system and a processing system including one or more hardware processors may be mounted to the circuit board 204, and bridging instructions may be included on the non-transitory memory system that, when executed by the processing system, cause the processing system to provide a bridging engine 206 that is configured to perform the functionality discussed below. In an embodiment, the bridging instructions may provide a mapping between one or more wireless communication services or characteristics for a wireless technology that is not native to a user device, and wireless communication services or characteristics for a wireless technology that is native to the user device, along with one or more communication patterns required to complete one or more predefined transactions, discussed in further detail below.

The bridging engine 206 is coupled (e.g., by couplings on the circuit board such as traces or other circuit board connectors known in the art that are connected to the processing system) to a first technology wireless controller 208 that is mounted to the circuit board 204. The first technology wireless controller 208 is configured to perform wireless communications using a first wireless technology. In a first set of embodiments discussed below, the first technology wireless controller 208 is a Bluetooth® technology wireless controller that is configured to perform wireless communications using a Bluetooth wireless technology. In specific examples of the first set of embodiments discussed below, the Bluetooth® technology wireless controller is configured to perform wireless communications using Bluetooth® Low Energy (BLE) wireless technology that provides for reduced power consumption and lower cost relative to traditional Bluetooth® wireless technology, while maintaining the same communication range. In a second set of embodiments discussed below, the first technology wireless controller 208 is an NFC technology wireless controller that is configured to perform wireless communications using an NFC wireless technology. However, while these two examples of wireless technologies are provided in the examples discussed below, one of skill in the art in possession of the present disclosure will recognize that a wide variety of different technology wireless controllers, other than those explicitly mentioned herein, that perform wireless communications using a wide variety of different wireless technologies, may be used as the first technology wireless controller 208 without departing from the scope of the present disclosure.

The bridging engine 206 is also coupled (e.g., by couplings on the circuit board such as traces or other circuit board connectors known in the art that are connected to the processing system) to a second technology wireless controller 210 that is mounted to the circuit board 204. The second technology wireless controller 210 is configured to perform wireless communications using a second wireless technology that is different than the first wireless technology used by the first technology wireless controller 208. In a first set of embodiments discussed below, the second technology wireless controller 210 is an NFC technology wireless controller that is configured to perform wireless communications using an NFC wireless technology. In a second set of embodiments discussed below, the second technology wireless controller 210 is a Bluetooth® technology wireless controller that is configured to perform wireless communications using a Bluetooth wireless technology. In specific examples of the second set of embodiments discussed below, the Bluetooth® technology wireless controller is configured to perform wireless communications using BLE wireless technology. However, while these two examples of wireless technologies are provided in the examples discussed below, one of skill in the art in possession of the present disclosure will recognize that a wide variety of different technology wireless controllers, other than those explicitly mentioned herein, that perform wireless communications using a wide variety of different wireless technologies, may be used as the second technology wireless controller 210 without departing from the scope of the present disclosure.

In the illustrated embodiment, an antenna 212 is coupled to the first technology wireless controller 208 and an antenna 214 is coupled to the second technology wireless controller 210, and each of the antennas 212 and 214 are configured for use in sending and receiving wireless communications through the first technology wireless controller 208 and the second technology wireless controller 210, respectively. In one example, each of the antennas 212 and 214 may be coupled to the first technology wireless controller 208 and the second technology wireless controller 210, respectively, by being mounted to the circuit board 204 and connected through traces or other circuit board connectors known in the art. In another example, each of the antennas 212 and 214 may be included in the first technology wireless controller 208 and the second technology wireless controller 210, respectively, and/or otherwise coupled the first technology wireless controller 208 and the second technology wireless controller 210 without be mounted to the circuit board 204. While only one antenna is illustrated as being provided for each of the first technology wireless controller 208 and the second technology wireless controller 210, multiple antennas may be provided for each of the first technology wireless controller 208 and the second technology wireless controller 210 in, for example, a diversity antenna scheme. Furthermore, a single antenna (or multiple antennas in, for example, a diversity antenna scheme), may be shared by each of the first technology wireless controller 208 and the second technology wireless controller 210 while remaining within the scope of the present disclosure.

Figure 2B:
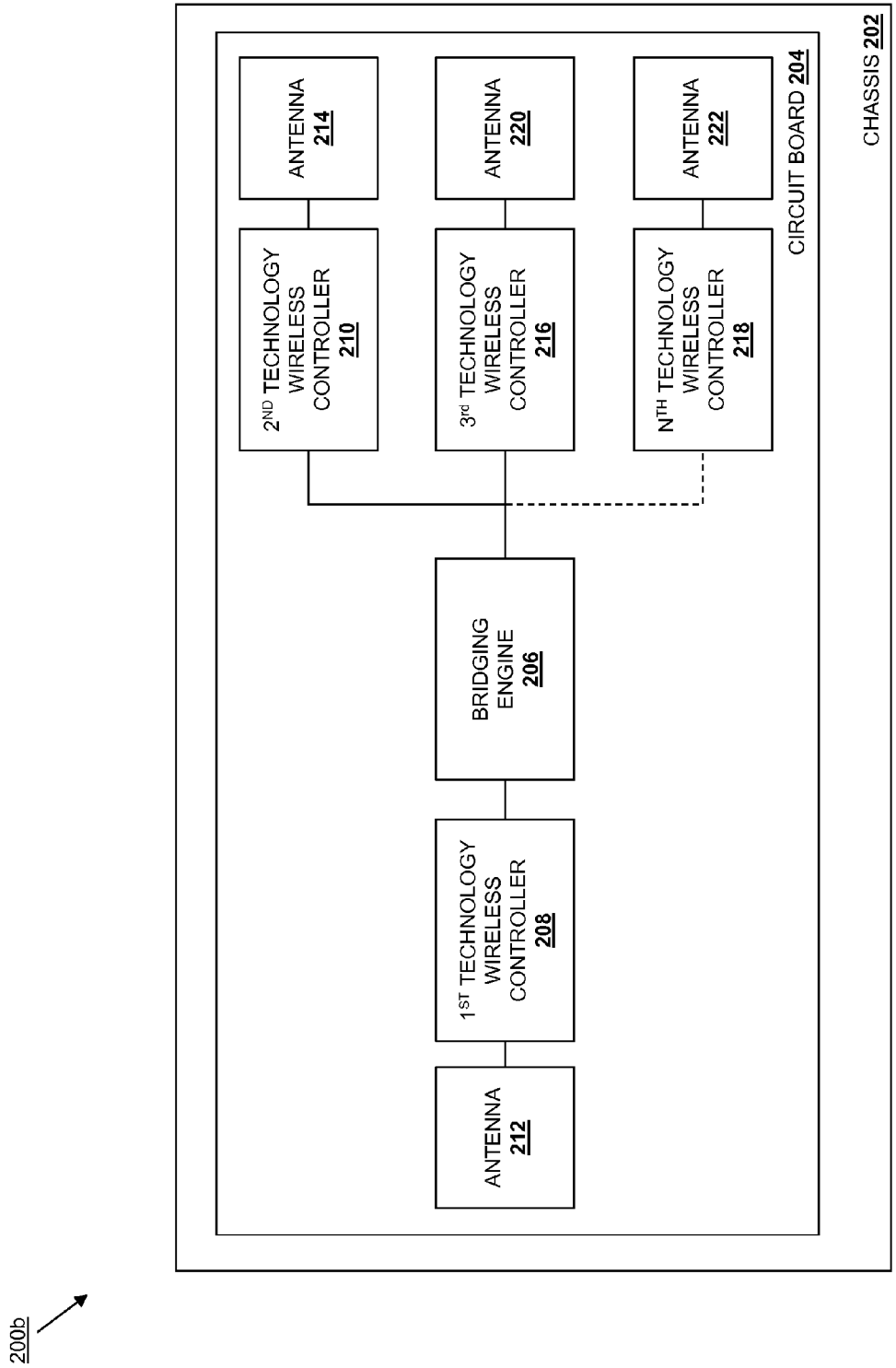
FIG. 2b is a schematic view illustrating an embodiment of a wireless technology bridging system.

Referring next to FIG. 2b, an embodiment of a wireless technology bridging system 200b is illustrated that is substantially similar to the wireless technology bridging system 200a, discussed above with reference to FIG. 2a, but with the provision of additional wireless controllers of different wireless technologies. As such, similar components including the bridging engine 206, the first technology wireless controller 208, the second technology wireless controller 210, and the antennas 212 and 214 include similar reference numbers. However, the wireless technology bridging system 200b includes the bridging engine 206 coupled (e.g., by couplings on the circuit board such as traces or other circuit board connectors known in the art that are connected to the processing system) to a third technology wireless controller 216 and up to an nth technology wireless controller 218 that are mounted to the circuit board 204. The third technology wireless controller 216 is configured to perform wireless communications using a third wireless technology that is different from the first wireless technology used by the first technology wireless controller 208 and the second wireless technology used by the second technology wireless controller 210. For example, the third technology wireless controller 216 may be a Wifi technology wireless controller that is configured to perform wireless communications using a Wifi wireless technology. As illustrated in FIG. 2b, a variety of different type technology wireless controllers may be provided in the wireless technology bridging system 200b.

Furthermore, in the illustrated embodiment, an antenna 220 is coupled to the third technology wireless controller 216, and antennas (e.g., the antenna 222) may be coupled to any other technology wireless controllers (e.g., the nth technology wireless controller 218) included in the wireless technology bridging system 200b similarly as discussed above with reference to the wireless technology bridging system 200a. Furthermore, as also discussed above with reference to the wireless technology bridging system 200a, any number of different technology wireless controllers in the wireless technology bridging system 200b may share any number of antennas.

While the wireless technology bridging systems 200a and 200b of FIGS. 2a and 2b have been provided for clarity of discussion and illustration, other components, connections, and/or other features known in the art may be provided on the circuit board 204 without departing from the scope of the present disclosure. For example, in some embodiments, the wireless technology bridging system 200a or 200b may include a battery or power source connector (e.g., to connect to and receive power from a user device) in order to power the wireless technology bridging system 200a or 200b. In a specific example, a power source connector on the wireless technology bridging system that connects to a power source on the user device may allow for the connection of a similar type connector to the power source connector so that the wireless technology bridging system does not need to be disconnected from the user device to, for example, charge the user device. Furthermore, while the bridging engine 206 (e.g., provided by a non-transitory memory and one or more hardware processors) and wireless controllers 208, 210, 216, and 218 have been illustrated and described as separate components, in some embodiments the bridging engine 206 and each of the different technology wireless controllers may be provided on the same hardware processor or combination of hardware processors while remaining within the scope of the present disclosure.

Referring now to FIG. 3, an embodiment of a wireless technology bridging system 300 coupled to a user device 302 is illustrated. The wireless technology bridging system 300 may be, or include some or all of the components of, the wireless technology bridging systems 200a and/or 200b discussed above with reference to FIGS. 2a and 2b. In the illustrated embodiment, an adhesive 306 is used to couple the wireless technology bridging system 300 to the user device 300.

In one example, the wireless technology bridging system chassis of the wireless technology bridging system 300 may be provided as a "sticker," with the wireless technology bridging system chassis including a protective covering that houses the circuit board and components of the wireless technology bridging system 300 (discussed above with reference to FIGS. 2a and 2b). Examples of protective coverings that may provide the wireless technology bridging system chassis include a casing made of a plastic material, a metal material, a rubber material, and/or a variety of other materials that one of skill in the art in possession of the present disclosure would recognize would protect the components of the wireless technology bridging system while allowing the functionality discussed here and thus fall within the scope of the present disclosure. The adhesive 306 may be included on the wireless technology bridging system chassis/protective covering (e.g., such that the wireless technology bridging system is provided as a sticker to apply to a user device), on the chassis of the user device 302, and/or may be applied by a user to either of the wireless technology bridging system chassis/protective covering or the chassis of the user device 302. Given current components sizes, the wireless technology bridging system 300 is envisioned as being dimensioned similar to a stick of gum, although larger and smaller sizes of the wireless technology bridging system 300 (e.g., based on reduced component sizes in the future) will fall within the scope of the present disclosure.

Figure 4:
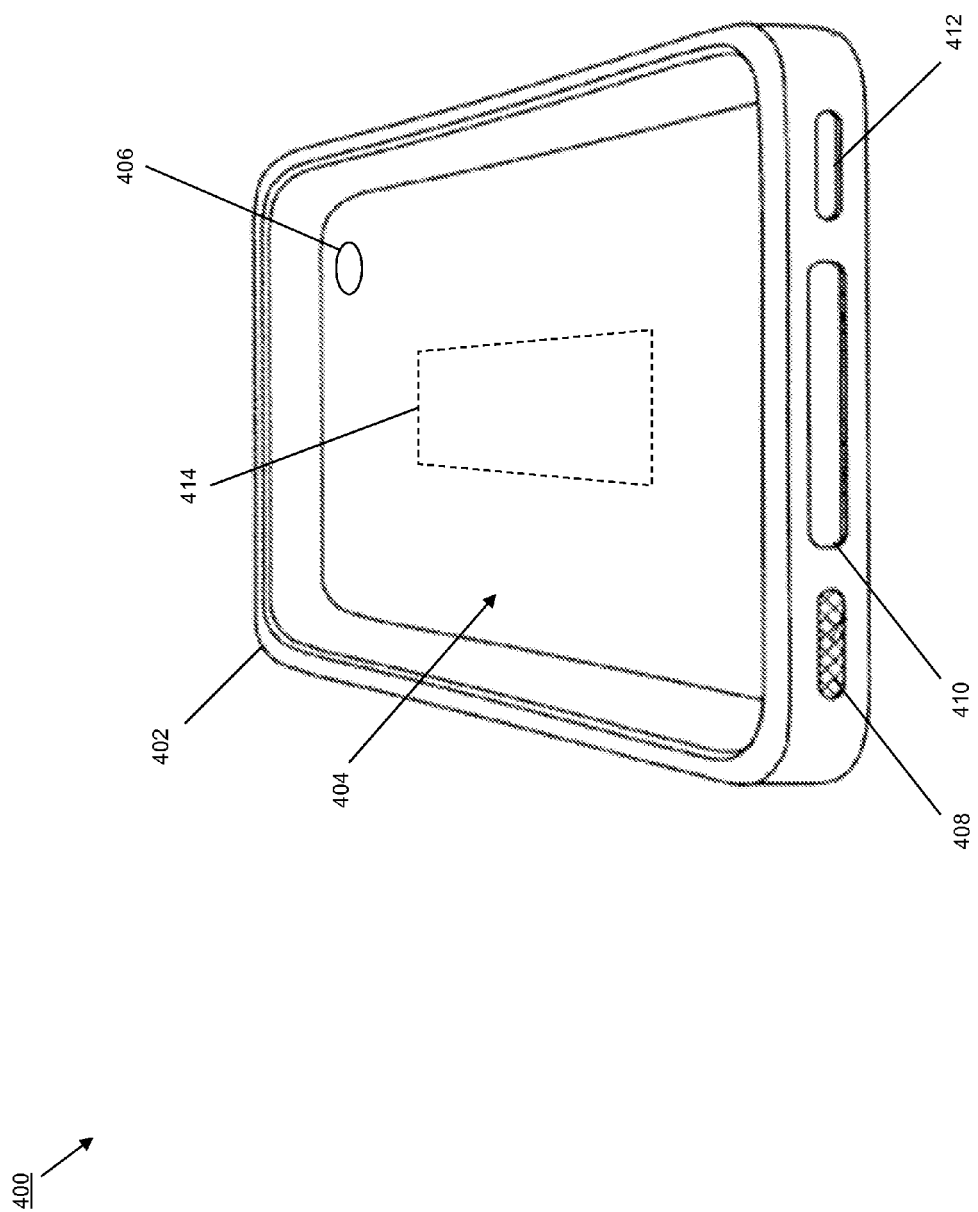
FIG. 4 is a perspective view illustrating an embodiment of a wireless technology bridging system.

Referring now to FIG. 4, an embodiment of a wireless technology bridging system 400 is illustrated. The wireless technology bridging system 400 may be, or include some or all of the components of, the wireless technology bridging systems 200a and/or 200b discussed above with reference to FIGS. 2a and 2b. In the illustrated embodiment, the wireless technology bridging system 400 is provided as a user device protective case.

In one example, the user device protective case of the wireless technology bridging system 400 includes a device case chassis 402 that defines a user device housing 404 that is configured to house a user device, a camera aperture 406 defined by the device case chassis 402, a microphone aperture 408 defined by the device case chassis 402, a speaker aperture 410 defined by the device case chassis 402, and a data and power connector aperture 412 defined by the device case chassis 402. In the illustrated embodiment, the circuit board 414 and components of the wireless technology bridging system 400 (discussed above with reference to FIGS. 2a and 2b) are embedded in the device case chassis 402 (as illustrated by the dashed line in FIG. 4 indicating the location of the circuit board 414). While one of skill in the art will recognize the user device protective case illustrated in FIG. 4 as a protective case for a mobile phone, they will recognize that a wide variety of cases for other types of user devices (e.g., tablet computers, laptop computers, etc.) will fall within the scope the present disclosure, as will different locations of the circuit board (e.g., attached the user device case rather than embedded in the device case chassis 402).

While a few examples of wireless technology bridging systems have been provided that include an adhesive chassis that may be adhered to a user device, as well as a user device protective case that may house a user device, one of skill in the art will recognize that the wireless technology bridging system described herein may be provided in a wide variety of other configurations while remaining within the scope of the present disclosure. For example, in some embodiments, the wireless technology bridging system may be provided within a user device, or in a manner that it may be shared by a plurality of user device.

As discussed above, a user device of the user may provide second wireless technology that is native to that user device due to the inclusion of a second technology wireless controller included in the user device, but the user may wish to be able to utilize a first wireless technology (or other wireless technology) that is different from the second wireless technology but that is not native to the user device. In a first set of embodiments discussed below, the second wireless controller in the user device includes an NFC wireless controller that is configured to perform wireless communications using an NFC wireless technology, and the user wishes to be able to utilize a Bluetooth® wireless technology such as BLE wireless technology provided at a merchant physical location for participating in a check-in system. In a second set of embodiments discussed below, the second technology wireless controller in the user device is a Bluetooth® technology wireless controller that is configured to perform wireless communications using a Bluetooth wireless technology, and the user wishes to be able to utilize an NFC wireless technology provided at a merchant physical location for participating in a payment system. However, as discussed above, the bridging of any different wireless technologies may fall within the scope of the present disclosure. Thus, a block 102 of the method 100, a user may adhered the wireless technology bridging system 300 to their user device 302, the user may house their user device in the user device housing 404 of the wireless technology bridging system 400, and/or may otherwise couple their user device to the wireless technology bridging system.

Referring now to FIGS. 1, 2a and/or 2b, 5, and 6, the method 100 then proceeds to block 104 where first wireless communications of a first wireless technology are received by the bridging engine in the wireless technology bridging system through the first wireless controller in the wireless technology bridging system.

Figure 5:
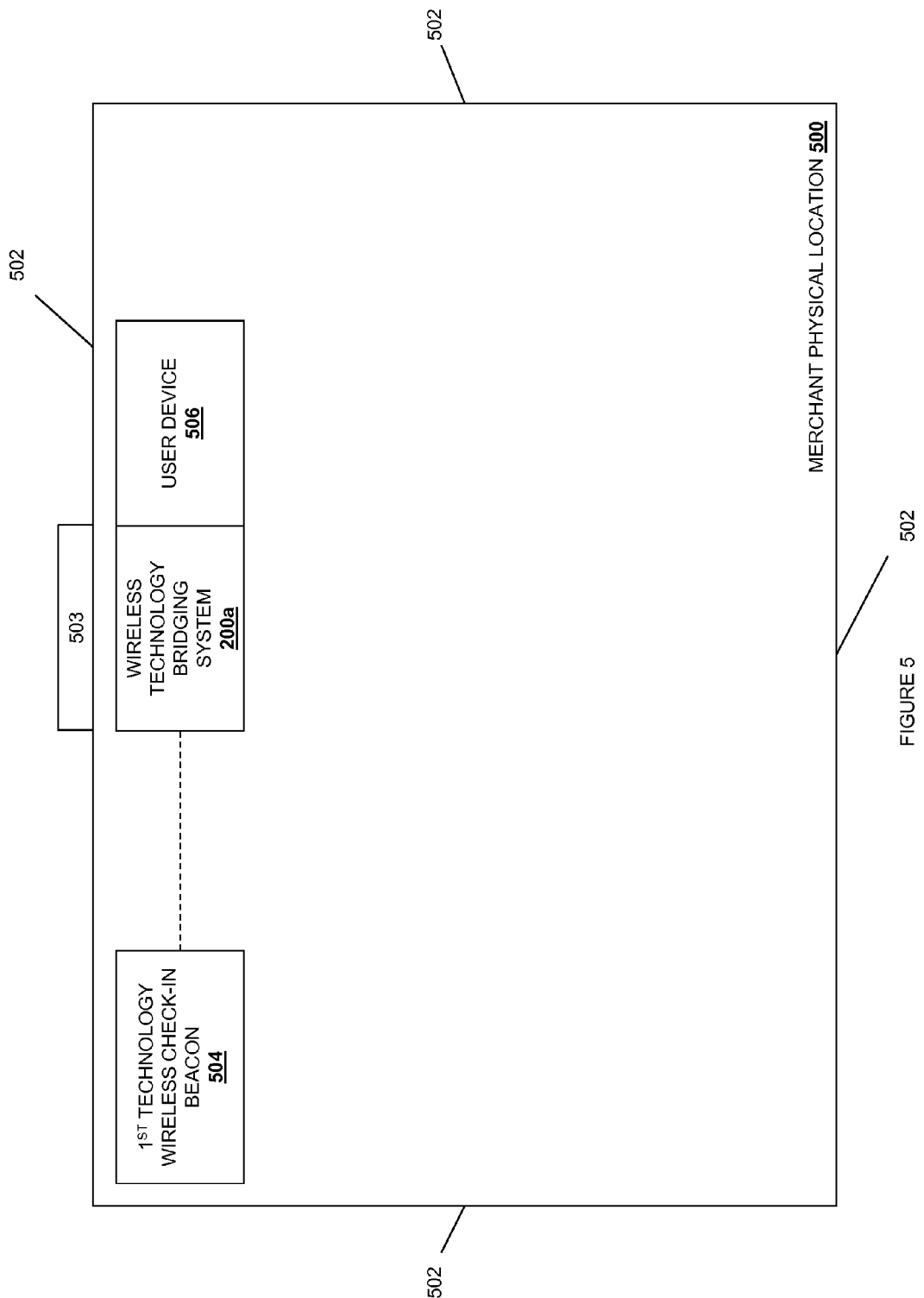
FIG. 5 is a schematic view illustrating an embodiment of a merchant physical location.

Referring first to FIG. 5, a first set of embodiments of the method 100 includes a merchant physical location 500 that may be a merchant "brick and mortar" store or other merchant place of business including a plurality of walls 502 that may define the merchant physical location 500, along with an entrance 503 that provides users access to the merchant physical location 500. In the illustrated embodiment, the merchant at the merchant physical location 500 uses one or more merchant devices to provide a wireless communication system that includes a first technology wireless check-in beacon 504. The first technology wireless check-in beacon 504 includes a first technology wireless controller that is configured to perform wireless communications using a first wireless technology that is different from the second wireless technology that is native to a user device 506 (which may be any of the user devices discussed above) of a user that has entered the merchant physical location 500 (e.g., through the entrance 503). The user device 506 has been coupled to the wireless technology bridging system 200a of FIG. 2a in block 102 of the method. While the wireless technology bridging system 200a of FIG. 2a is discussed below with regard to the embodiments including FIG. 5, any of the wireless technology bridging systems discussed above may be substituted for the wireless technology bridging system 200a while remaining within the scope of the present disclosure.

As discussed above, in one example of this first set of embodiments, the first wireless technology is a Bluetooth® wireless technology such as, for example, BLE wireless technology, and the first technology wireless controller in the first technology wireless check-in beacon 504 is a Bluetooth® wireless controller; the second technology wireless controller in the user device 506 is an NFC wireless controller that is configured to perform wireless communications using an NFC wireless technology; and the wireless technology bridging system 200a includes a Bluetooth® wireless controller as the first technology wireless controller 208 and an NFC wireless controller as the second technology wireless controller 210.

At block 104 of the method 100, a user with the user device 506 coupled to the wireless technology bridging system 200a may enter the merchant physical location 500 through the entrance 503. In specific embodiments, the first technology wireless check-in beacon 504 may be broadcasting first wireless communications as check-in information using BLE wireless technology. For example, the first technology wireless check-in beacon 504 may broadcast check-in information that may include a merchant identifier, a location, an advanced encryption standard (AES) key, and/or a variety of other check-in information known in the art, and that check-in information may be recognizable by a check-in application on the user device 506 in the background of an operating system on the user device 506. However, because the check-in information in the first wireless communication is broadcast using the first wireless technology, the user device 506 is unable to receive that first wireless communication directly (i.e., because the first wireless technology is not supported natively by the user device 506 due to the lack of a first technology wireless controller). However, at block 104, the bridging engine 206 in the wireless technology bridging system 200a receives the first wireless communication from the first technology wireless check-in beacon 504 through the first technology wireless controller 208 (e.g., using the antenna 212.)

The table provided below lists a few examples of check-in information that may be included in the broadcast from the first technology wireless check-in beacon at block 104 of the method 100:

| Characteristic | Example Value | Permissions |
| --- | --- | --- |
| Store Name | The Home Depot | RO |
| Merchant ID | AAA9AA8AA7AA | RO |
| Location ID | DTN2S9KZUM123 | RO |
| Timestamp | 1365528756 | RO |
| Beacon ID | 235B2 | RO, Notify |
| Signature v1 | | RO, Notify |
| Request | nil | RW |
| Response | nil | RO, Notify |
| Event | nil | RO, Notify |

Figure 6:
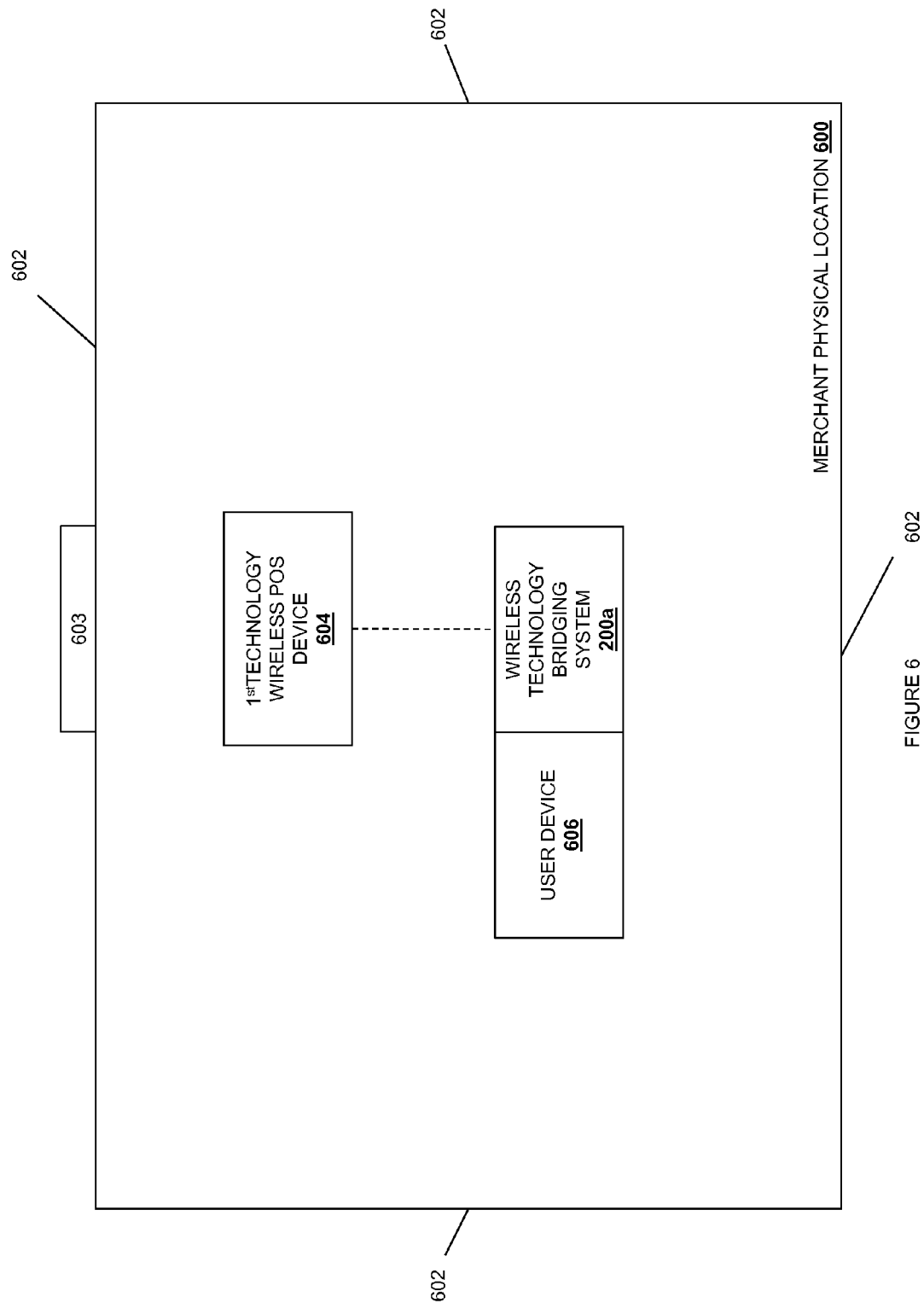
FIG. 6 is a schematic view illustrating an embodiment of a merchant physical location.

Referring next to FIG. 6, a second set of embodiments of the method 100 include a merchant physical location 600 that may be a merchant "brick and mortar" store or other merchant place of business including a plurality of walls 602 that may define the merchant physical location 600, along with an entrance 603 that provides users access to the merchant physical location 600. In the illustrated embodiment, the merchant at the merchant physical location 600 uses one or more merchant devices to provide a wireless communication system that includes a first technology wireless Point Of Sale (POS) device 604 that includes a first technology wireless controller that is configured to perform wireless communications using a first wireless technology that is different from the second wireless technology that is native to a user device 606 (which may be any of the user devices discussed above) that is coupled to the wireless technology bridging system 200a of FIG. 2a. While the wireless technology bridging system 200a of FIG. 2a is discussed below as being used in the embodiment illustrated in FIG. 6, any of the wireless technology bridging systems discussed herein may be substituted for the wireless technology bridging system 200a while remaining within the scope of the present disclosure.

As discussed above, in one example of this second set of embodiments, the first wireless technology is an NFC wireless technology and the first technology wireless controller in the first technology wireless POS device 604 is an NFC wireless controller; the second technology wireless controller in the user device 506 is a Bluetooth® wireless controller that performs wireless communications using Bluetooth® wireless technology; and the wireless technology bridging system 200a includes an NFC wireless controller as the first technology wireless controller 208 and a Bluetooth® wireless controller as the second technology wireless controller 210.

At block 104 of the method 100, a user with the user device 606 coupled to the wireless technology bridging system 200a may have selected one or more products and/or services available at the merchant physical location 600, and may then approach the first technology wireless POS device 604 to initiate a payment transaction with the merchant to pay for the one or more products and/or services. In one example, the first technology wireless POS device 604 may operate as an NFC tag by broadcasting an NFC signal that includes NDEF record information such as that is recognizable by a payment application on the user device 606 to begin a payment transaction when the user device 606 is positioned adjacent the first technology wireless POS device 604. However, because the payment information in the first wireless communication is broadcast using the first wireless technology, the user device 506 is unable to receive that first wireless communication directly when positioned adjacent the first technology wireless POS device 604 (i.e., because the first wireless technology is not supported natively by the user device 506 due to the lack of a first technology wireless controller). However, at block 104, when the user device 606 is positioned adjacent the first technology wireless POS device 604, the bridging engine 206 in the wireless technology bridging system 200a will receive the first wireless communication from the first technology wireless POS device 604 through the first technology wireless controller 208 (e.g., using the antenna 212). In an embodiment, NDEF record information may include, for example, 3-bit Type Name Format (TNF) information that indicates how to interpret the variable length type field, Variable length type information that describes the type of the record, variable length ID information that is a unique identifier for the record, variable length payload information that is the actual data payload that is to be read or written, and/or a variety of other NDEF record information known in the art.

The method 100 then proceeds to block 106 where the bridging engine in the wireless technology bridging system converts the first wireless communications of the first wireless technology to first wireless communication of a second wireless technology (i.e., the first wireless communications received at block 104 are converted from the first wireless technology to the second wireless technology).

Referring back to the first set of embodiments illustrated in FIG. 5, the bridging engine 206 in the wireless technology bridging system 200a has received the first wireless communications of the Bluetooth® wireless technology (e.g., BLE wireless technology) from the first technology wireless check-in beacon 504. As discussed above, the first wireless communication of the BLE wireless technology includes check-in information that includes a merchant identifier, a location, an AES key, and/or a variety of other check-in information known in the art. At block 106, the bridging engine 206 may convert the first wireless communication of the BLE wireless technology to first wireless communication of the NFC wireless technology by writing the merchant identifier, location, AES key, and/or other check-in information to an NFC Data Exchange Format (NDEF) record. In some embodiments, that NDEF record may be stored in a database in a non-transitory memory mounted to the circuit board 204.

Referring back to the second set of embodiments illustrated in FIG. 6, the bridging engine 206 in the wireless technology bridging system 200a has received the first wireless communications of the NFC wireless technology from the first technology wireless POS device 604. As discussed above, the first wireless communication of the NFC wireless technology may include the NDEF record information discussed above. At block 106, the bridging engine 206 may convert the first wireless communication of the NFC wireless technology to the first wireless communication of the Bluetooth® wireless technology by writing the NDEF record information in a Bluetooth® format known in the art and into corresponding and identified BLE characteristics. In some embodiments, that NDEF record information may be stored in a database in a non-transitory memory mounted to the circuit board 204.

The method 100 then proceeds to block 108 where the bridging engine 206 sends the first wireless communications of the second wireless technology through the second technology wireless controller on the wireless technology bridging system and to the second technology wireless controller in the user device. Thus, at block 108, the user device receives the first wireless communications of the second wireless technology through its second technology wireless controller (that is included in the user device).

Referring back to the first set of embodiments illustrated in FIG. 5, the bridging engine 206 in the wireless technology bridging system 200a has converted the first wireless communications received from the first technology wireless check-in beacon 504 from the BLE wireless technology to the NFC wireless technology. As discussed above, the first wireless communications of the NFC wireless technology may include an NDEF record with a merchant identifier, a location, an AES key, and/or other check-in information received from the first technology wireless check-in beacon 504 in the first wireless communication of the BLE wireless technology.

In an embodiment of block 108, the bridging engine 204 causes the second technology wireless controller 210 (an NFC wireless controller in this embodiment) to begin emulating an NFC tag by causing it to be powered at predetermined intervals such that the NDEF record is broadcast at predetermined intervals. For example, at block 108, the bridging engine 204 may cause the second technology/NFC wireless controller 210 to turn on and off at 1 second intervals in order to broadcast the NDEF record (e.g., the first wireless communications of the second/NFC wireless technology) such that the operation of the second technology/NFC wireless controller 210 simulates the movement ("swiping") of the user device 506 near an NFC payment system. At block 108, the user of the user device 506 may turn on, unlock, or otherwise activate the user device 506, and in response the second technology/NFC wireless controller in the user device will receive the first wireless communications of the second/NFC wireless technology from the wireless technology bridging system 200a. One of skill in the art in possession of the present disclosure will recognize that the emulation of an NFC tag by the second technology/NFC wireless controller 210 may provide benefits when, for example, the user device 506 does not support 2-way NFC communication. However, in embodiments where the user device 506 supports 2-way NFC communication, the first wireless communications of the second/NFC wireless technology from the second technology/NFC wireless controller 210 in the wireless technology bridging system 200a may immediately provide for communication with the user device 506 such that the emulation of the NFC tag discussed above is not necessary and may be omitted.

In an embodiment, the first technology wireless check-in beacon 504 is a BLE beacon device that may operate in the following manner. The BLE beacon device may operate to periodically or continuously advertise a service with a known Universally Unique Identifier (UUID). The bridging engine 206 may operate to monitor for BLE signals (using the first technology wireless controller 208) with the UUID. In one example, iPhone® devices allow UUIDs to be mapped to specific applications to have those applications automatically launched when a registered UUID is discovered, while a similar feature (a "tag dispatch system") is available on Android® devices to associate NFC tags with a particular application (e.g., an NDEF record with a known Uniform Resource Identifier (URI) that could be dispatched to an appropriately registered application via an "ACTION_NDEF_DISCOVERED" Intent). Thus, in one example of the embodiment illustrated in FIG. 5, the bridging engine 206 causes the NFC wireless controller 210 to emulate a read/write NFC tag of a URI type (packaged in an NDEF record on the virtual/emulated tag) known to be associated with an application on the user device. By powering the NFC emulation periodically (e.g., one or two seconds powered, one or two seconds powered off, etc.), it will appear to the user device (with a native NFC wireless controller) that the user device is repeatedly touching an NFC tag. When the user device is unlocked, the operating system will cause the application to become active and able to transact with the bridging engine 206, and through a protocol of writing to the emulated NFC tag (through the emulation of a read/write tag by the bridging engine 206 and NFC wireless controller 210) to send data to the bridging engine 206 and reading data from the emulated NFC tag when it communicates, the user device can establish two-way communications to the bridging engine 206, and thus through the bridging engine 206 to the BLE beacon device.

In an embodiment, the bridging between the first wireless technology controller 208 and the second wireless technology controller 210 may be accomplished by the bridging engine 206 as follows: fields that are simple strings (e.g., store name, merchant ID, etc.) may be mapped from the characteristic into an appropriately labeled or tagged NDEF record. The RW Request field and the fields marked as Notify (e.g., see the chart in para. [0041]) may be handled differently as they may require action on the user device communication side or the BLE beacon device communication side. The application in the user device may write to the emulated NFC tag to set the Response value, and the state of the Notify fields may be monitored.

In some embodiments, a special NDEF record may be added to facilitate communications by keeping track of where in the BLE beacon device interchange the communication is, and to synchronize with the BLE beacon device, the bridging engine 206, and the application in the user device. When the bridging engine 206 causes the emulation of the NFC tag, the special NDEF record may flag the payload to indicate state such as "waiting for the BLE beacon to respond", "you have a notification to take care of", "beacon is waiting for your response", "beacon is no longer detected", etc.

In an embodiment, the bridging engine 206 is an active participant in all bridged communications, and will know when the application in the user device has made a Request (as the bridging engine 206 is a read/write tag from the perspective of the application in the user device, and that application writes to the particular NDEF record corresponding to a Request). For example, the bridging engine 206 actively monitors the NFC record for changes so that it can then pass that information over to the BLE beacon device by copying the Request data from the NDEF record into the RW Request characteristic communicated to the BLE beacon device. At each step, the bridging engine 206 may cause the emulated tag to disappear and reappear (e.g., by enabling and disabling the transmitted output of the NFC wireless controller 210) such that it appears to the user device that it is being touched to a sequence of unrelated NFC tags that happen to be associated with the same application in the user device that is identified by the known URI mechanism described above. However, the application in the user device may be complicit in this process in that the application understands that the tag information that is being received is not independent but rather a sequence of requests and responses in the context of completing a check-in transaction, a purchase transaction, etc. While there are other methods for accomplishing NFC communication with the BLE beacon device beyond tag emulation, such as Android Beam and others, that will fall within the scope of the present disclosure, the emulation of a simple R/W tag as discussed above provides a method that is currently supported on most user devices and thus allows for the transaction discussed above with a maximum number of user devices in current use.

Thus, blocks 104, 106, and 108 of the method 100 provide for a wireless communication from the merchant using a wireless technology that is not natively supported by the user device 506 to be received by the user device 506 using the wireless technology bridging system 200a.

Referring back to the second set of embodiments illustrated in FIG. 6, the bridging engine 206 in the wireless technology bridging system 200a has converted the first wireless communications received from the first technology wireless POS device 604 from the NFC wireless technology to the Bluetooth® wireless technology. As discussed above, the first wireless communication of the Bluetooth® wireless technology may include NFC record information received from the first technology wireless POS device 604 in the first wireless communication of the NFC wireless technology. At block 108, the bridging engine 204 causes the second technology wireless controller 210 (a Bluetooth® wireless controller in this embodiment) to send that information (e.g., the first wireless communications of the second/Bluetooth® wireless technology) to the user device 606. Thus, a wireless communication from the merchant using a wireless technology that is not natively supported by the user device 606 is received by the user device 606 using the wireless technology bridging system 200a.

The method 100 then proceeds to block 110 where the bridging engine 206 receives a second wireless communication of the second wireless technology through the second technology wireless controller on the wireless technology bridging system. Following the receiving of the first wireless communication of the second wireless technology at block 108, the user device may send a second wireless communication of the second wireless technology using the second technology wireless controller in the user device.

In one example using the first set of embodiments illustrated in FIG. 5, the first wireless communications of the second wireless technology received by the user device 506 may cause the user device 506 to display a user interface to the user that allows the user to confirm that they would like to check-in to the merchant physical location 500 (e.g., "press OK to confirm you would like to check-in to merchant physical location 500"), and in response to such confirmation, the user device 506 may use its second technology wireless controller to transmit second wireless communications as an NDEF record (e.g., via a tag write operation). In another example using the second set of embodiments illustrated in FIG. 6, the first wireless communications of the second wireless technology received by the user device 606 may cause the user device 506 to activate and display a user interface to the user that allows the user to begin a payment transaction with the merchant physical location 500 (e.g., by including a payment transaction screen that details products, prices, payment information, etc.), and in response the user providing selections (e.g., of a payment account, of a payment instructions, etc.), the user device 506 may use its second technology wireless controller to transmit second wireless communications.

Referring back to the first set of embodiments illustrated in FIG. 5, the bridging engine 206 in the wireless technology bridging system 200a receives the second wireless communication of the second/NFC wireless technology from the user device 506 through the second technology/NFC wireless controller 210 (e.g., using the antenna 214). The second wireless communication of the NFC wireless technology sent from the user device 506 may include a user identifier, a communication that the user has successfully checked in, a pre-authorized spending limit, a time limit for the check-in expiration, special offers, coupons, and/or other check-in response information known in the art. At block 110, the bridging engine 204 receives the second wireless communication of the second/NFC wireless technology from the user device 506.

Referring back to the first set of embodiments illustrated in FIG. 6, the bridging engine 206 in the wireless technology bridging system 200a receives the second wireless communication of the second/Bluetooth® wireless technology from the user device 606 through the second technology/Bluetooth wireless controller 210 (e.g., using the antenna 214). The second wireless communication of the Bluetooth wireless technology sent from the user device 506 may include a user identifier, a store identifier, a register identifier, an amount of money to be paid, and/or other payment response information known in the art. At block 110, the bridging engine 204 receives the second wireless communication of the second/Bluetooth® wireless technology from the user device 506.

As is known in the art, there are size limits on the amount of data that may be written to a single characteristic, so sending a complete NDEF record from an NFC technology wireless controller to a BLE technology wireless controller may require multiple write cycles to push all the data through the bridge system.

The method 100 then proceeds to block 112 where the bridging engine in the wireless technology bridging system converts the second wireless communications of the second wireless technology to second wireless communication of the first wireless technology (i.e., the second wireless communications received at block 110 are converted from the second wireless technology to the first wireless technology).

Referring back to the first set of embodiments illustrated in FIG. 5, the bridging engine 206 in the wireless technology bridging system 200a has received the second wireless communications of the NFC wireless technology from the user device 506. As discussed above, the second wireless communication of the NFC wireless technology might include check-in response information such as a user identifier, a communication that the user has successfully checked in, a pre-authorized spending limit, a time limit for the check-in expiration, special offers, coupons, and/or a variety of other check-in response information known in the art. At block 112, the bridging engine 206 may convert the second wireless communications of the NFC wireless technology to second wireless communications of the BLE wireless technology by writing the user identifier, a communication that the user has successfully checked in, a pre-authorized spending limit, a time limit for the check-in expiration, special offers, coupons, and/or other check-in response information to a record. In some embodiments, that record may be stored in a database in a non-transitory memory mounted to the circuit board 204.

Referring back to the second set of embodiments illustrated in FIG. 6, the bridging engine 206 in the wireless technology bridging system 200a has received the second wireless communications of the Bluetooth wireless technology from the user device 606. As discussed above, the second wireless communication of the Bluetooth wireless technology includes payment response information that includes a user identifier, a store identifier, a register identifier, an amount of money to be paid, and/or a variety of other payment response information known in the art. At block 112, the bridging engine 206 may convert the second wireless communications of the Bluetooth wireless technology to the second wireless communication of the NFC wireless technology by writing the user identifier, a store identifier, a register identifier, an amount of money to be paid, and/or other payment response information to a record. In some embodiments, that record may be stored in a database in a non-transitory memory mounted to the circuit board 204.

The method 100 then proceeds to block 114 where the bridging engine 206 sends the second wireless communications of the first wireless technology through the first technology wireless controller on the wireless technology bridging system and to a first technology wireless controller in the wireless communication system provided by the merchant. Thus, at block 114, the wireless communication system provided by the merchant receives the second wireless communications of the first wireless technology through a first technology wireless controller in the wireless communication system.

Referring back to the first set of embodiments illustrated in FIG. 5, the bridging engine 206 in the wireless technology bridging system 200a has converted the second wireless communications of the NFC wireless technology received from the user device 506 to the second wireless communications of the first/BLE wireless technology. As discussed above, the second wireless communication of the first/BLE wireless technology may include a record with a user identifier a communication that the user has successfully checked in, a pre-authorized spending limit, a time limit for the check-in expiration, special offers, coupons, and/or other check-in response information received from the user device 506 in the second wireless communication of the second/NFC wireless technology. At block 114, the bridging engine 204 causes the first technology wireless controller 208 (a BLE wireless controller in this embodiment) to broadcast the record. At block 114, the first technology wireless check-in beacon 504 receives the second wireless communications of the first/BLE wireless technology from the wireless technology bridging system 200a through the first technology/BLE wireless controller in the first technology wireless check-in beacon 504. Thus, a wireless communication from the user device 506 to the first technology wireless check-in beacon 504 in the wireless communication system of the merchant using a wireless technology that is not natively supported by the first technology wireless check-in beacon 504 is received by the first technology wireless check-in beacon 504 using the wireless technology bridging system 200a.

Referring back to the second set of embodiments illustrated in FIG. 6, the bridging engine 206 in the wireless technology bridging system 200a has converted the second wireless communications of the Bluetooth® wireless technology received from the user device 506 to the second wireless communications of the first/NFC wireless technology. As discussed above, the second wireless communication of the first/NFC wireless technology may include a record with a user identifier a store identifier, a register identifier, an amount of money to be paid, and/or other payment response information received from the user device 506 in the second wireless communication of the second/Bluetooth® wireless technology. At block 114, the bridging engine 206 causes the first technology wireless controller 208 (an NFC wireless controller in this embodiment) to broadcast the record. At block 114, the first technology wireless POS device 604 receives the second wireless communications of the first/NFC wireless technology from the wireless technology bridging system 200a through the first technology/NFC wireless controller in the first technology wireless POS device 604. Thus, a wireless communication from the user device to the first technology wireless POS device 604 in the wireless communication system of the merchant using a wireless technology that is not natively supported by the first technology wireless POS device 604 is received by the first technology wireless POS device 604 using the wireless technology bridging system 200a.

While a first wireless communication from a wireless communication system provided by a merchant to the user device, and a second wireless communication from the user device back to the wireless communication system provided by the merchant have been described, one of skill in the art in possession of the present disclosure will recognize that any number of communications back and forth between the wireless communication system and the user device may be enabled using the wireless technology bridging system described herein.

Thus, systems and methods for bridging wireless technologies have been described that allow devices that do not natively support wireless communications using a particular wireless technology to communicate with devices that utilize that particular wireless technology. While examples including the bridging of wireless technologies to allow a user device that natively supports NFC wireless technology to communicate with a merchant device that natively supports BLE wireless technology, as well as to allow a user device that natively supports Bluetooth® wireless technology to communicate with a merchant device that natively supports NFC wireless technology, have been provided, one of skill in the art in possession of the present disclosure will recognize that any wireless technologies may be bridged using the systems and methods described herein. Furthermore, the wireless technology bridging systems described herein may be provided for easy coupling to a user device that utilizes them by, for example, providing those wireless technology bridging systems in a user device case with an adhesive chassis, and/or using a variety of other coupling techniques known in the art.

Figure 7:
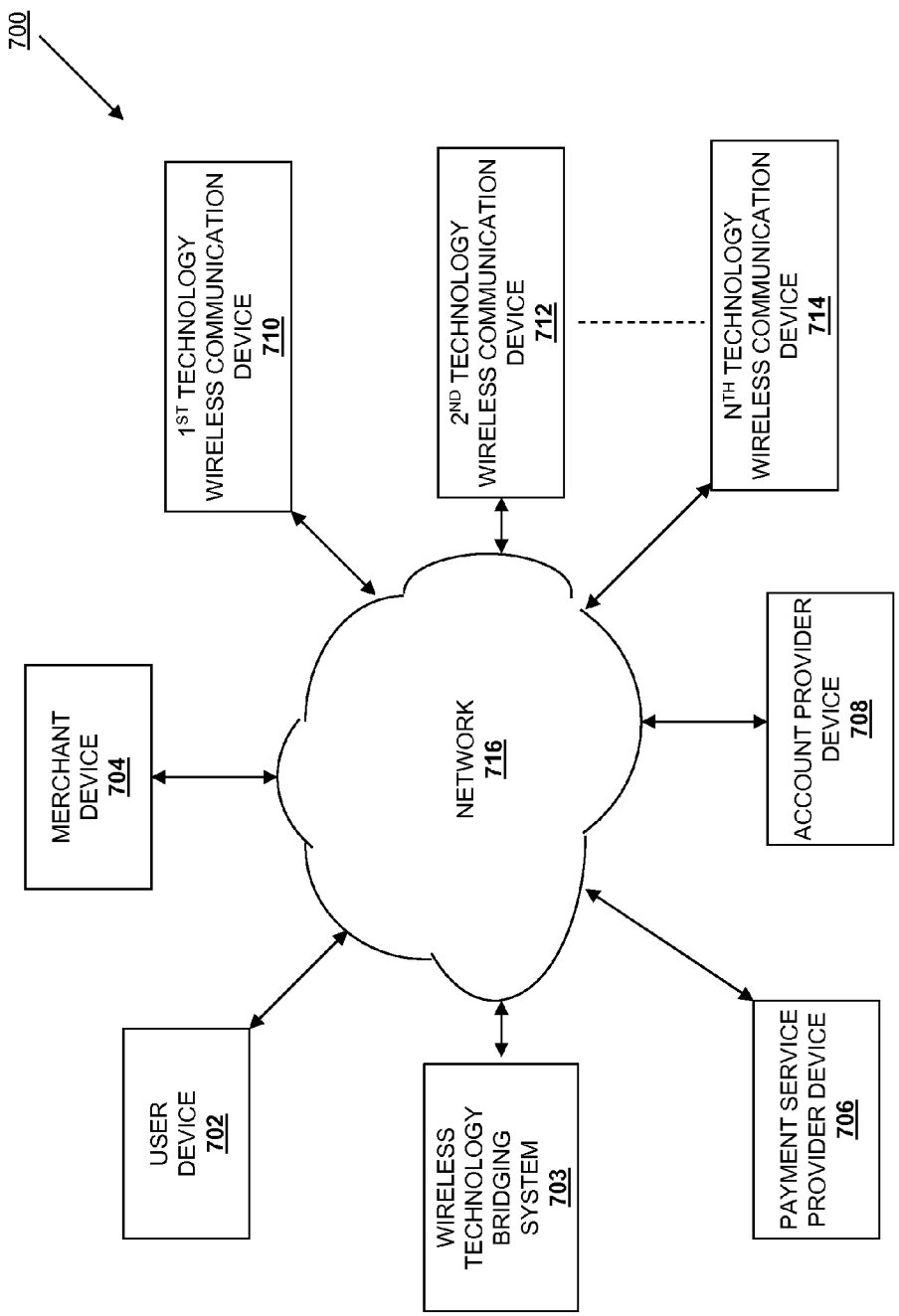
FIG. 7 is a schematic view illustrating an embodiment of a networked system.

Referring now to FIG. 7, an embodiment of a network-based system 700 for implementing one or more processes described herein is illustrated. As shown, network-based system 700 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 700 illustrated in FIG. 7 include a user device 702, a wireless technology bridging system 703, a merchant device 704, a payment service provider device 706, an account provider device 708, and/or a first technology wireless communication device 710, a second technology wireless communication device 712, and up to an nth technology wireless communication device 714 in communication over a network 716. The user device 702 may be the user devices 302, 506, and/or 606, discussed above. The wireless technology bridging system 703 may be the wireless technology bridging systems 200a, 200b, 300, and/or 400, discussed above. The merchant device 704 may be the merchant devices discussed above and may be operated by the merchants discussed above. The payment service provider device 706 may be the payment service provider devices discussed above and may be operated by a payment service provider such as, for example, PayPal Inc. of San Jose, Calif. The account provider device 708 may be the account provider devices discussed above and may be operated by the account providers discussed above such as, for example, credit card account providers, bank account providers, savings account providers, and a variety of other account providers known in the art. The first technology wireless communication device 710, second technology wireless communication device 712, and up to the nth technology wireless communication device 714 may be the first technology wireless check-in beacon 504, the first technology wireless POS device 604, and/or any of the other wireless communication devices discussed above.

The user device 702, wireless technology bridging system 703, merchant device 704, payment service provider device 706, account provider device 708, and/or different technology wireless communication devices 710-714 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 716.

The network 716 may be implemented as a single network or a combination of multiple networks. For example, in various embodiments, the network 716 may include the Internet and/or one or more intranets, landline networks, wireless networks, and/or other appropriate types of networks.

The user device 702 may be implemented using any appropriate combination of hardware and/or software configured for wired and/or wireless communication over network 716. For example, in one embodiment, the user device 702 may be implemented as a personal computer of a user in communication with the Internet. In other embodiments, the user device 702 may be a smart phone, personal digital assistant (PDA), laptop computer, tablet computer, wearable user device, and/or other types of computing devices.

The user device 702 may include one or more browser applications which may be used, for example, to provide a convenient interface to permit the user to browse information available over the network 716. For example, in one embodiment, the browser application may be implemented as a web browser configured to view information available over the Internet.

The user device 702 may also include one or more toolbar applications which may be used, for example, to provide user-side processing for performing desired tasks in response to operations selected by the user. In one embodiment, the toolbar application may display a user interface in connection with the browser application.

The user device 702 may further include other applications as may be desired in particular embodiments to provide desired features to the user device 702. In particular, the other applications may include a payment application for payments assisted by a payment service provider through the payment service provider device 706. The other applications may also include security applications for implementing user-side security features, programmatic user applications for interfacing with appropriate application programming interfaces (APIs) over the network 716, or other types of applications. Email and/or text applications may also be included, which allow the user to send and receive emails and/or text messages through the network 716. The user device 702 includes one or more user and/or device identifiers which may be implemented, for example, as operating system registry entries, cookies associated with the browser application, identifiers associated with hardware of the user device 702, or other appropriate identifiers, such as a phone number. In one embodiment, the user identifier may be used by the payment service provider device 706 and/or account provider device 708 to associate the user with a particular account as further described herein.

The merchant device 704 may be maintained, for example, by a conventional or on-line merchant, conventional or digital goods seller, individual seller, and/or application developer offering various products and/or services in exchange for payment to be received conventionally or over the network 716. In this regard, the merchant device 704 may include a database identifying available products and/or services (e.g., collectively referred to as items) which may be made available for viewing and purchase by the user.

The merchant device 704 also includes a checkout application which may be configured to facilitate the purchase by the payer of items. The checkout application may be configured to accept payment information from the user through the user device 702, the wireless technology bridging system 703, the payment service provider device 706, the account provider device 708, and/or the different technology wireless communication devices 710-714 over the network 716.

Figure 8:
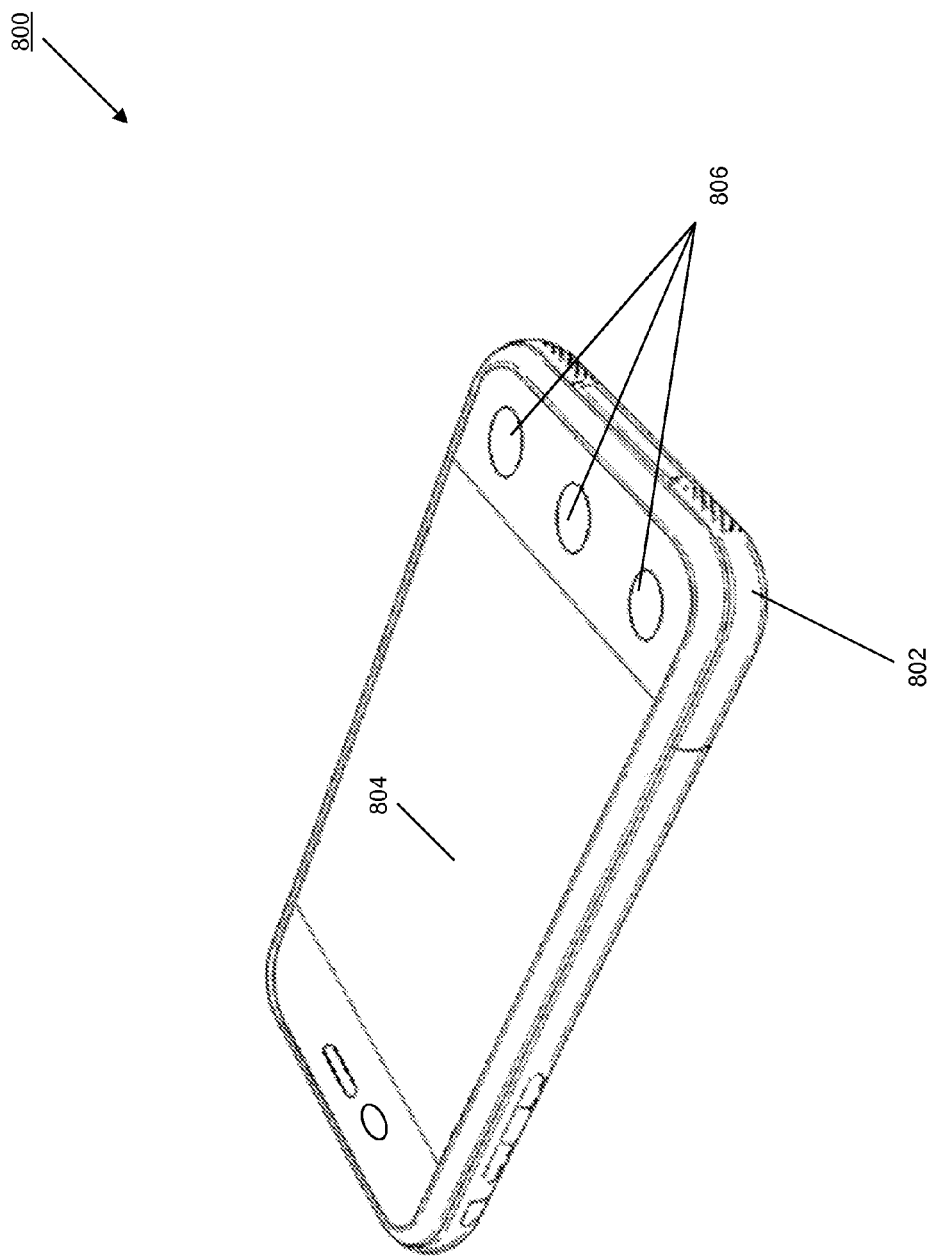
FIG. 8 is a perspective view illustrating an embodiment of a user device.

Referring now to FIG. 8, an embodiment of a user device 800 is illustrated. The user device 700 may be the user devices 302, 506, 606, and/or 702. The user device 800 includes a chassis 802 having a display 804 and an input device including the display 804 and a plurality of input buttons 806. One of skill in the art will recognize that the user device 800 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 9:
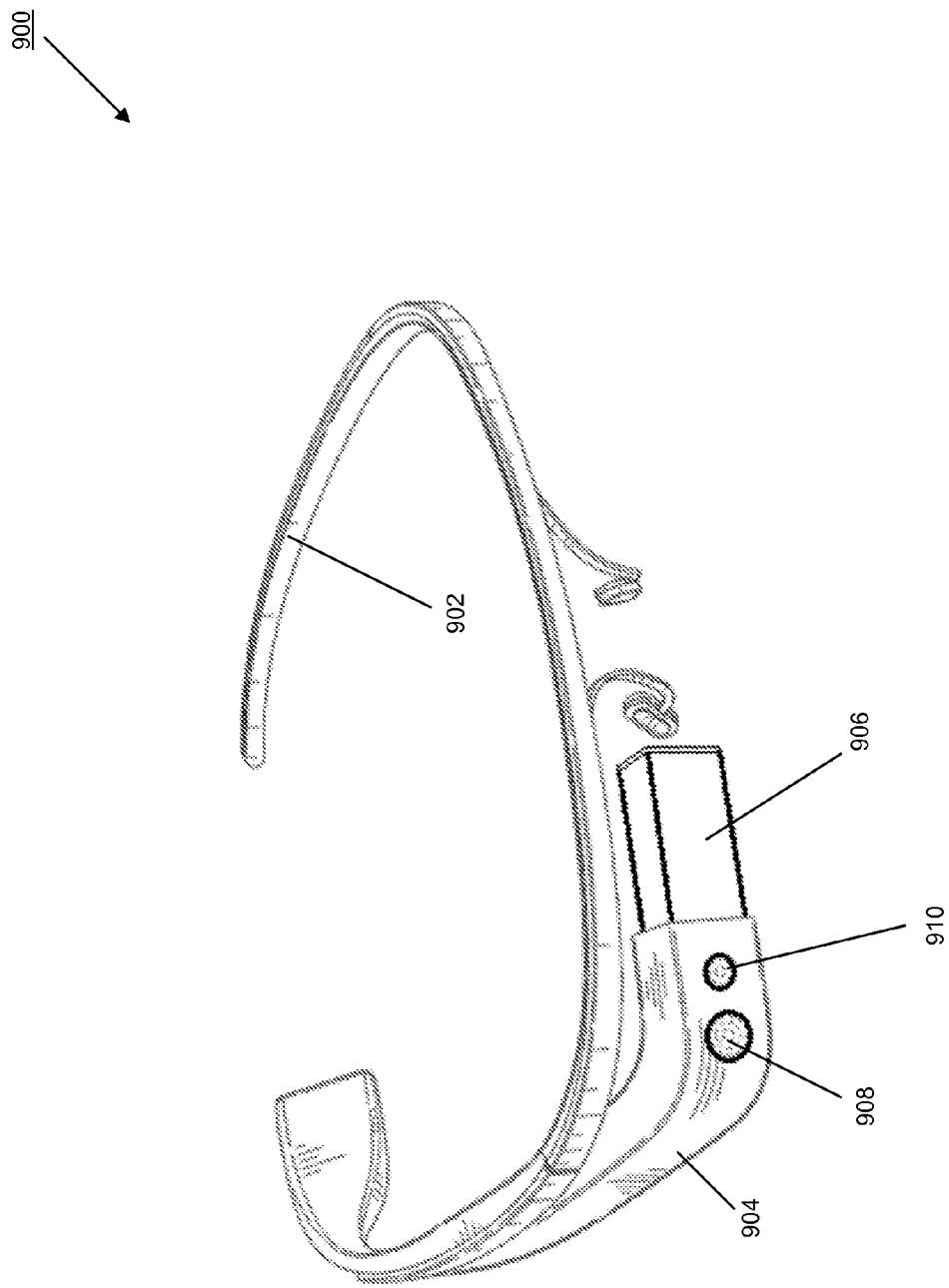
FIG. 9 is a perspective view illustrating an embodiment of a user device.

Referring now to FIG. 9, an embodiment of a user device 900 is illustrated. The user device 900 may be the may be the user devices 302, 506, 606, and/or 702, discussed above. The user device 900 includes a frame 902 having a computing chassis 904 that extends from the frame 902, a display 906 that extends from the computing chassis 904, a microphone 908 located on the computing chassis 904, and a camera located on the computing chassis 904. One of skill in the art will recognize that the user device 900 is a mobile wearable user device such as, for example, Google Glass® available from Google Inc. of Mountain View, Calif. that may provide a user with some of the functionality discussed above with reference to the method 100. However, a variety of other mobile wearable user devices may be used in the method 100 without departing from the scope of the present disclosure.

Figure 10:
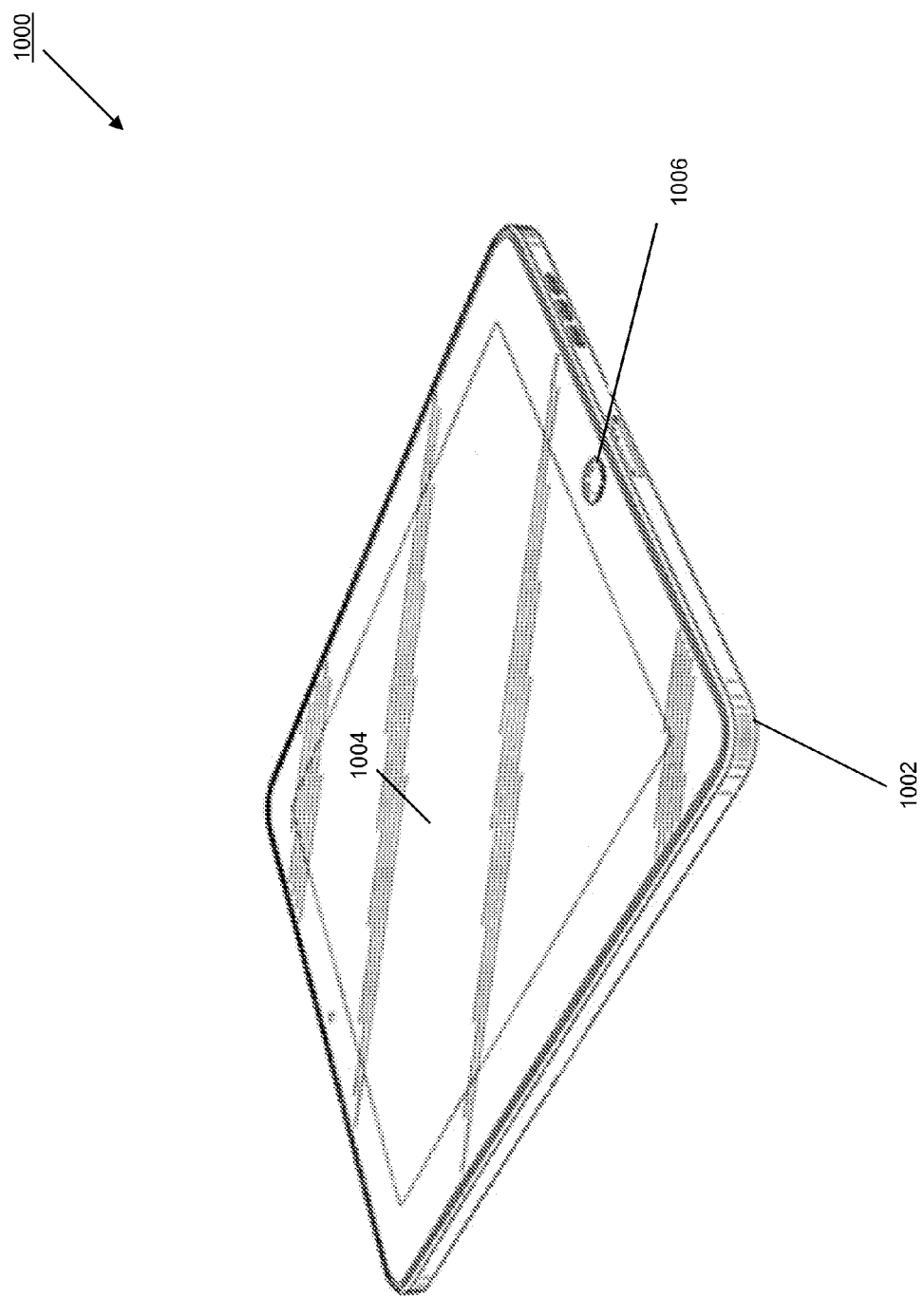
FIG. 10 is a perspective view illustrating an embodiment of a user device.

Referring now to FIG. 10, an embodiment of a user device 1000 is illustrated. The user device 700 may be the user devices 302, 506, 606, and/or 702. The user device 1000 includes a chassis 1002 having a display 1004 and an input device including the display 1004 and an input button 1006. One of skill in the art will recognize that the user device 1000 is a tablet computer including a touch screen input device and input button that allow the functionality discussed above with reference to the method 100. However, a variety of other tablet devices may be used in the method 100 without departing from the scope of the present disclosure.

Figure 11:
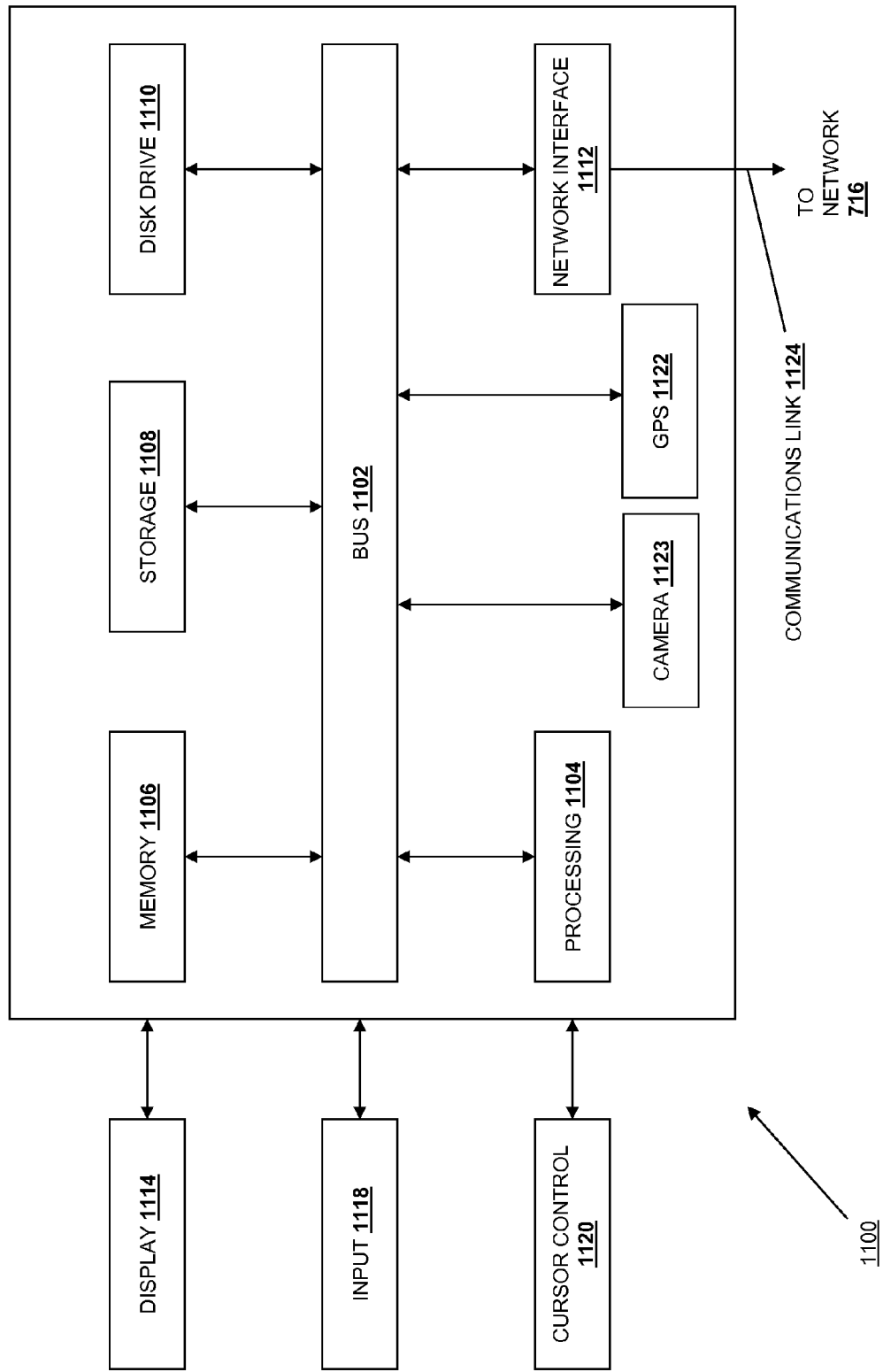
FIG. 11 is a schematic view illustrating an embodiment of a computer system.

Referring now to FIG. 11, an embodiment of a computer system 800 suitable for implementing, for example, the user devices 302, 506, 606, 702, 800, 900, and/or 1000, the wireless technology bridging systems 200a, 200b, 300, 400, and/or 703, the merchant device 704, the payment service provider device 706, the account provider device 708, and/or the different technology wireless communication devices 710-714, is illustrated. It should be appreciated that other devices utilized by users, merchants, payment service providers, and account providers in the payment system discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), a location determination component 1122 (e.g., a Global Positioning System (GPS) device as illustrated, a cell tower triangulation device, and/or a variety of other location determination devices known in the art), and/or a camera component 1123. In one implementation, the disk drive component 1110 may comprise a database having one or more disk drive components.

In accordance with embodiments of the present disclosure, the computer system 1100 performs specific operations by the processor 1104 executing one or more sequences of instructions contained in the memory component 1106, such as described herein with respect to the user devices 302, 506, 606, 702, 800, 900, and/or 1000, the wireless technology bridging systems 200a, 200b, 300, 400, and/or 703, the merchant device 704, the payment service provider device 706, the account provider device 708, and/or the different technology wireless communication devices 710-714. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that comprise the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Figure 12:
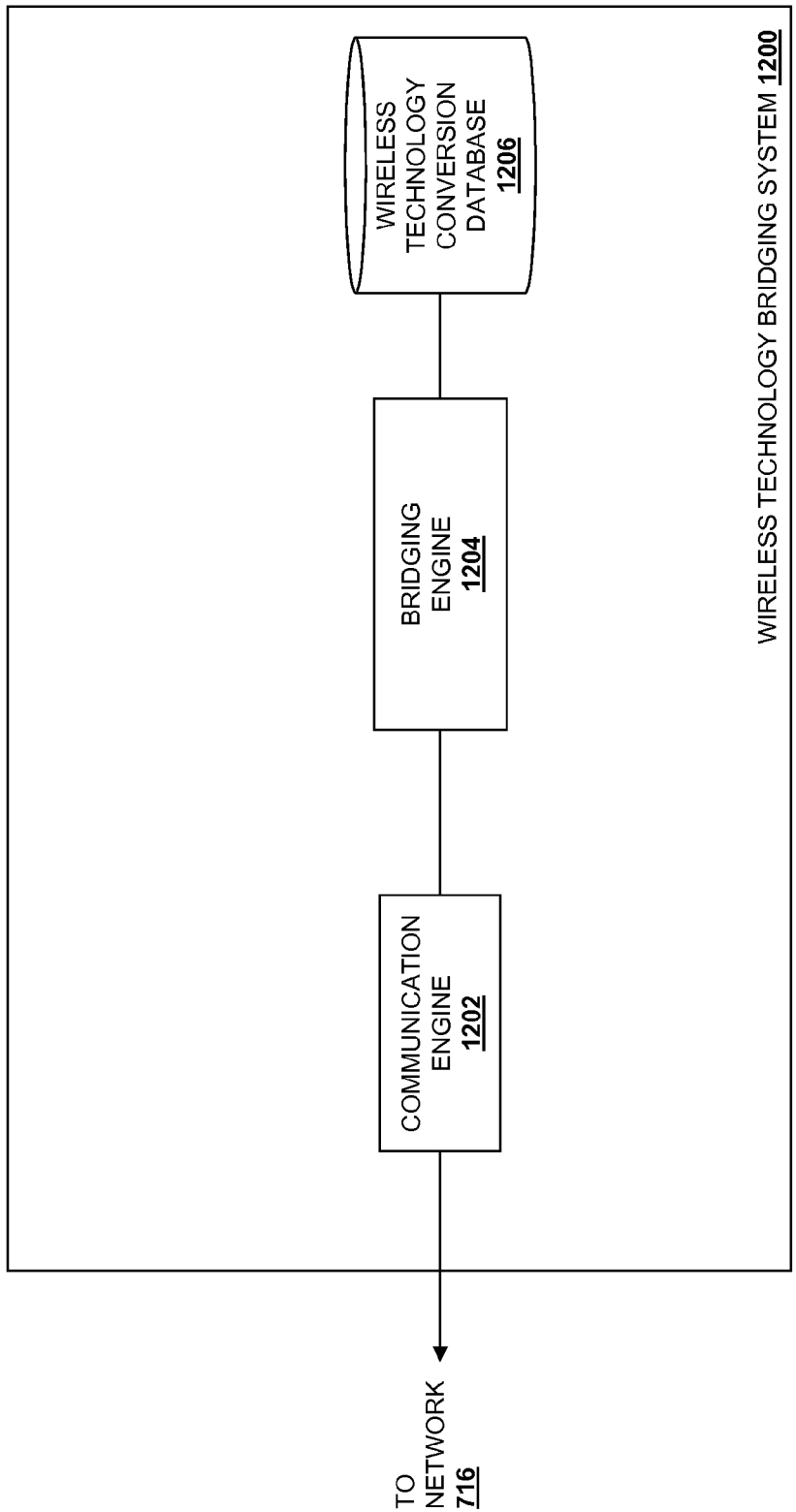
FIG. 12 is a schematic view illustrating an embodiment of a wireless technology bridging system.

Referring now to FIGS. 12, an embodiment of a wireless technology bridging system 1200 is illustrated. In an embodiment, the wireless technology bridging system 1200 may be the wireless technology bridging systems 200a, 200b, 300, 400, and/or 703. The wireless technology bridging system 1200 includes a communication engine 1202 that is coupled to the network 716 and to a bridging engine 1204 that is coupled to a wireless technology conversion database 1206 that may include details for converting wireless communications between different wireless technologies, described above. The communication engine 1202 may be software or instructions stored on a computer-readable medium that allows the wireless technology bridging system 1200 to send and receive information over the network 716. The bridging engine 1204 may be software or instructions stored on a computer-readable medium that is operable to receive wireless communications of a particular wireless technology from a first device, convert those wireless communications to a different wireless technology, send those converted wireless communications to a second device, and provide any of the other functionality that is discussed above. While the wireless technology conversion database 1206 has been illustrated as located in the wireless technology bridging system 1200, one of skill in the art will recognize that it may be connected to the bridging engine 1204 through the network 716 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and users; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A wireless technology bridging system, comprising:
   a circuit board;
   a first technology wireless controller mounted to the circuit board and configured to perform wireless communications using a first wireless technology;
   a second technology wireless controller mounted to the circuit board and configured to perform wireless communications using a second wireless technology that is different than the first wireless technology;
   a non-transitory memory storing bridging instructions for converting wireless communication information between the first wireless technology and the second wireless technology;
   one or more hardware processors coupled to each of the memory, the first technology wireless controller, and the second technology wireless controller, wherein the one or more hardware processors are configured to read instructions from the memory to provide a bridging engine that performs the steps of:
      receiving first wireless communications of the first wireless technology through the first technology wireless controller;
      converting the first wireless communications from the first wireless technology to the second wireless technology; and
      sending the first wireless communications of the second wireless technology through the second wireless technology controller and to a user device.

2. The wireless technology bridging system of claim 1, further comprising:
   at least one antenna coupled to each of the first wireless technology controller and the second wireless technology controller, wherein the at least one antenna is configured for use in sending and receiving wireless communications through the first wireless technology controller and the second wireless technology controller.

3. The wireless technology bridging system of claim 1, wherein one or more hardware processors are configured to read instructions from the memory to provide a bridging engine that further performs the steps of:
   receiving second wireless communications of the second wireless technology through the second technology wireless controller and from the user device;
   converting the second wireless communications from the second wireless technology to the first wireless technology; and
   sending the second wireless communications of the first wireless technology through the first wireless technology controller.

4. The wireless technology bridging system of claim 1, further comprising:
   a chassis that houses each of the circuit board, the first technology wireless controller, the second technology wireless controller, the non-transitory memory, and the one or more hardware processors, wherein the chassis is one of a user device case that is configured to house the user device, or an adhesive chassis that is configured to adhere to the user device.

5. The wireless technology bridging system of claim 1, wherein the first wireless technology controller is a Bluetooth wireless controller and the first wireless technology is a Bluetooth wireless technology, and wherein the second wireless technology controller is a Near Field Communication (NFC) wireless controller and the second wireless technology is an NFC wireless technology.

6. The system of claim 5, wherein the bridging engine converting the first wireless communications from the Bluetooth wireless technology to the NFC wireless technology, and sending the first wireless communications of the NFC wireless technology through the NFC wireless technology controller and to the user device, includes:
   writing the first wireless communications of the Bluetooth wireless technology as an NFC Data Exchange Format (NDEF) record; and
   causing the NFC wireless controller to emulate an NFC tag by causing the NFC wireless controller to be powered at predetermined intervals.

7. A bridged wireless communication system, comprising:
   a user device housing a user device wireless controller that is configured to perform wireless communications using a second wireless technology;
   a wireless technology bridging system chassis coupled to the user device, the wireless technology bridging system chassis housing:
      a circuit board;
      a first technology wireless controller mounted to the circuit board and configured to perform wireless communications using a first wireless technology that is different from the second wireless technology;
      a second technology wireless controller mounted to the circuit board and configured to perform wireless communications using the second wireless technology; and
      a bridging engine coupled to each of the first technology wireless controller and the second technology wireless controller, wherein the bridging engine is configured to perform the steps of:
         receiving first wireless communications of the first wireless technology through the first technology wireless controller;
         converting the first wireless communications from the first wireless technology to the second wireless technology; and
         sending the first wireless communications of the second wireless technology through the second wireless technology controller and to the user device wireless controller in the user device.

8. The bridged wireless communication system of claim 7, wherein the wireless technology bridging system chassis further houses:
at least one antenna coupled to each of the first wireless technology controller and the second wireless technology controller, wherein the at least one antenna is configured for use in sending and receiving wireless communications through the first wireless technology controller and the second wireless technology controller.

9. The bridged wireless communication system of claim 7, wherein the bridging engine is configured to further perform the steps of:
receiving second wireless communications of the second wireless technology through the second technology wireless controller and from the user device wireless controller in the user device;
converting the second wireless communications from the second wireless technology to the first wireless technology; and
sending the second wireless communications of the first wireless technology through the first wireless technology controller.

10. The bridged wireless communication system of claim 7, wherein the wireless technology bridging system chassis is a user device case that houses the user device.

11. The bridged wireless communication system of claim 7, wherein the wireless technology bridging system chassis is an adhesive chassis that is adhered to the user device.

12. The bridged wireless communication system of claim 7, wherein the first wireless technology controller is a Bluetooth wireless controller and the first wireless technology is a Bluetooth wireless technology, and wherein the second wireless technology controller is a Near Field Communication (NFC) wireless controller and the second wireless technology is an NFC wireless technology.

13. The bridged wireless communication system of claim 12, wherein the bridging engine converting the first wireless communications from the Bluetooth wireless technology to the NFC wireless technology, and sending the first wireless communications of the NFC wireless technology through the NFC wireless technology controller and to the user device, includes:
writing the first wireless communications of the Bluetooth wireless technology as an NFC Data Exchange Format (NDEF) record; and
causing the NFC wireless controller to emulate an NFC tag by causing the NFC wireless controller to be powered at predetermined intervals.

14. A method for bridging wireless technologies, comprising:
providing a wireless technology bridging system chassis that houses a circuit board including a non-transitory memory and at least one processor that are configured to provide a bridging engine;
receiving, by the bridging engine, first wireless communications of a first wireless technology through a first technology wireless controller that is mounted to the circuit board;
converting, using the bridging engine, the first wireless communications from the first wireless technology to a second wireless technology that is different from the first wireless technology; and
sending, by the bridging engine to a user device, the first wireless communications of the second wireless technology through a second wireless technology controller that is mounted to the circuit board.

15. The method of claim 14, wherein the receiving the first wireless communications of the first wireless technology through the first technology wireless controller includes receiving the first wireless communications of the first wireless technology through at least one antenna that is coupled to the first wireless technology controller, and the sending the first wireless communications of the second wireless technology through the second wireless technology controller includes sending the first wireless communications of the second wireless technology through at least one antenna that is coupled to the second wireless technology controller.

16. The method of claim 14 further comprising:
receiving, by the bridging engine, second wireless communications of the second wireless technology through the second technology wireless controller and from the user device;
converting, using the bridging engine, the second wireless communications from the second wireless technology to the first wireless technology; and
sending, by the bridging engine, the second wireless communications of the first wireless technology through the first wireless technology controller.

17. The method of claim 14, wherein the wireless technology bridging system chassis is a user device case that houses the user device.

18. The method of claim 14, wherein the wireless technology bridging system chassis is an adhesive chassis that is adhered to the user device.

19. The method of claim 14, wherein the first wireless technology controller is a Bluetooth wireless controller and the first wireless technology is a Bluetooth wireless technology, and wherein the second wireless technology controller is a Near Field Communication (NFC) wireless controller and the second wireless technology is an NFC wireless technology.

20. The method of claim 19, wherein the bridging engine converting the first wireless communications from the Bluetooth wireless technology to the NFC wireless technology, and sending the first wireless communications of the NFC wireless technology through the NFC wireless technology controller and to the user device, includes:
writing the first wireless communications of the Bluetooth wireless technology as an NFC Data Exchange Format (NDEF) record; and
causing the NFC wireless controller to emulate an NFC tag by causing the NFC wireless controller to be powered at predetermined intervals.

* * * * *